Figure 1:
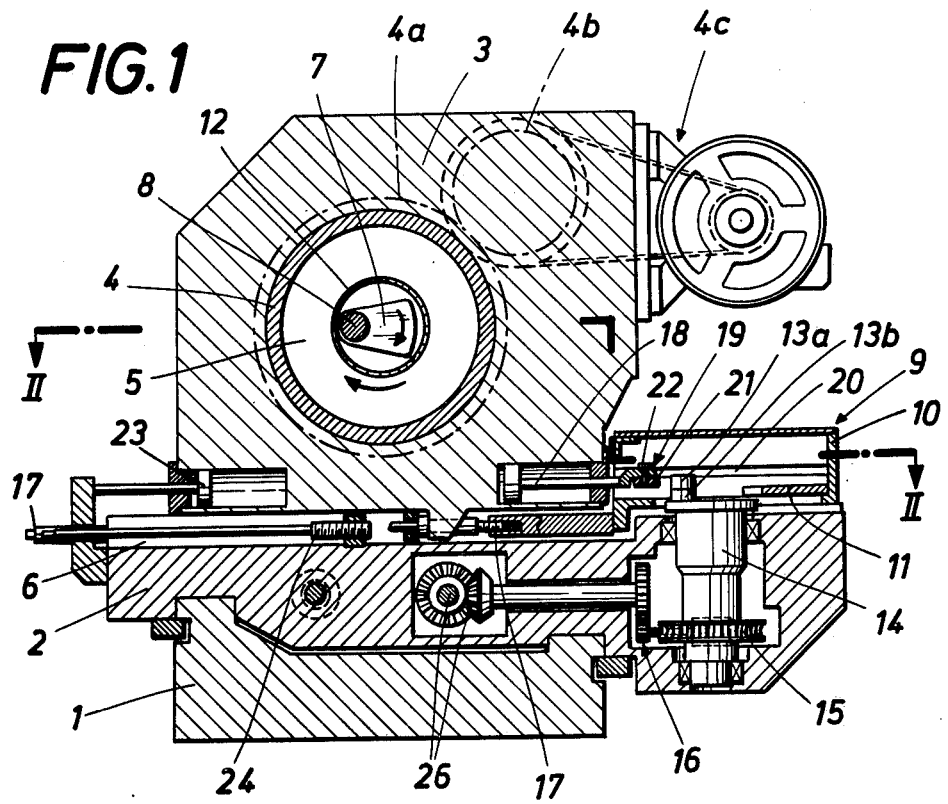

United States Patent [19]

Marzy

[11] 4,157,055
[45] Jun. 5, 1979

[54] COPYING ATTACHMENT FOR CRANKSHAFT MILLING MACHINE

[75] Inventor: Otto Marzy, Steyr, Austria

[73] Assignee: GFM Gesellschaft fur Fertigungstechnik und Maschinenbau Aktiengesellschaft, Steyr, Austria

[21] Appl. No.: 947,407

[22] Filed: Oct. 2, 1978

Related U.S. Application Data

[63] Continuation-in-part of Ser. No. 796,702, May 13, 1977, abandoned.

[30] Foreign Application Priority Data

May 21, 1976 [AT] Austria ................................. 3749/76

[51] Int. Cl.² ................................................ B23C 1/18
[52] U.S. Cl. .......................................... 409/113; 82/9; 82/20; 409/199
[58] Field of Search ...................... 90/13.4, 13.9, 11 R, 90/15 R; 82/9, 20

[56] References Cited

U.S. PATENT DOCUMENTS

| | | | |
|---|---|---|---|
| 3,595,131 | 7/1971 | Rozanek et al. | 90/13.9 |
| 3,880,025 | 4/1975 | Kralowetz | 82/9 |

Primary Examiner—Gil Weidenfeld
Attorney, Agent, or Firm—Kurt Kelman

[57] ABSTRACT

Known machines for milling a crankshaft comprise a longitudinal carriage movable in a first direction, a tool carriage movable on the longitudinal carriage for reciprocation relative thereto in a direction transverse to the first direction, a cutter head mounted on the tool carriage for rotation and having a cutting tool with inwardly directed cutting edge extending along a cutting circle and a chuck supporting a workpiece for rotation about the same axis as the cutter head and surrounded by the cutting circle. The invention provides a copying attachment comprising a template connected to the tool carriage for reciprocation therewith and having an arcuate edge portion, a roller mounted on the longitudinal carriage for rotation about an axis parallel to the axis about which the arcuate template edge portion is centered, a crank revolving the roller about a third axis parallel to, and spaced from, the said axes, and a hydraulic actuator connected to the tool carriage and including a head applying pressure to a side of the roller remote from the template edge portion, the actuator being operable to press the head into engagement with the remote roller side to force the roller towards the edge portion of the template.

11 Claims, 3 Drawing Figures

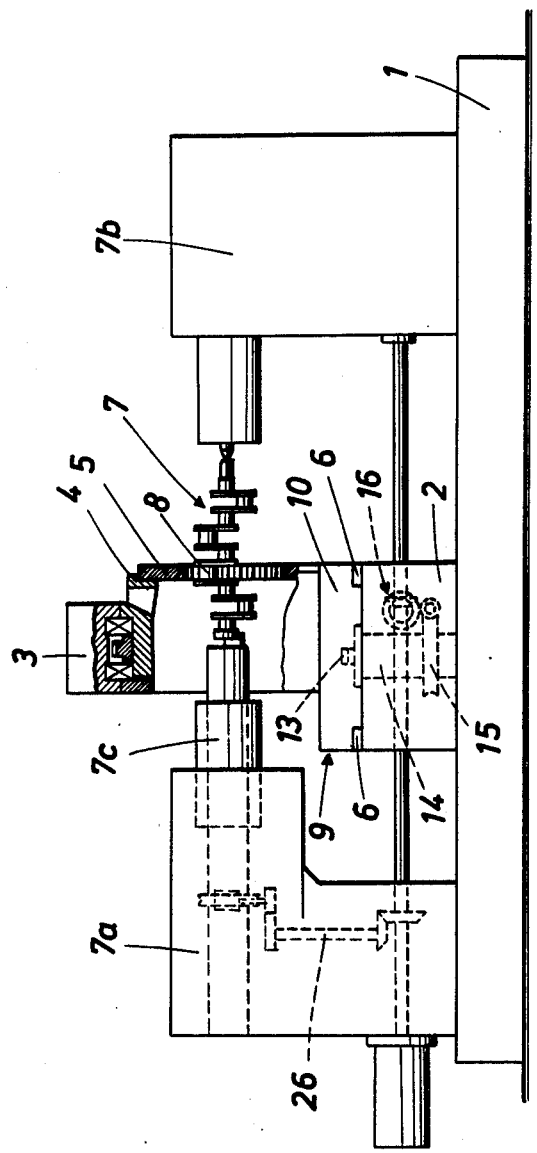

COPYING ATTACHMENT FOR CRANKSHAFT MILLING MACHINE

This is a continuation-in-part of my copending patent application Ser. No. 796,702, filed May 13, 1977, now abandoned.

The present invention relates to a copying attachment for machines for milling a crankshaft comprising a tool carriage which is movable along transverse guides provided in a longitudinal carriage, the latter being movable parallel to the longitudinal axis of the machine bed, the tool carriage being adapted to move a cutter head in a direction which is normal to a rotatable workpiece machined by inwardly extending cutting edges of the cutter head, which surround the rotating workpiece in a cutting circle, copying device comprises a template with an edge portion having the configuration of an arc of a circle and connected to the tool carriage, a roller revolvable by a crank mounted on the longitudinal carriage, the template and roller having the same geometric and kinematic relationship to each other as the cutting circle has to the workpiece portion to be milled, and a hydraulic actuator operable to urge the roller and template against each other.

By means of such copying attachment, the movement of the tool carriage can be controlled in such a manner that the rotating workpiece can be milled to form concentric as well as eccentric portions which are circular in cross-section, as is required in the machining of crankshafts. This result is due to the fact that the crank-mounted roller of the copying attachment simulates the shape and revolving movement of the crankpin which is to be milled because the diameter of the roller corresponds to the diameter of the crankpin and the eccentricity of the crank corresponds to the eccentricity of the crankpin. The template having the shape of an arc of a circle conforms to the cutting circle described by the cutting edges of the cutter tool during a rotation thereof and, if the crankshaft to be milled and the crank which carries the roller rotate at the same speed, the cutter head and the tool carriage will perform those transverse movements which are required for a milling of the crankpin, provided that the roller and template are forced against each other and are always held in contact with each other. As the roller revolves on the crank mounted in the longitudinal carriage, the roller imparts the required component of motion to the template connected to the tool carriage and can be displaced with the latter only transversely to the tool, so that the movement required for the milling of the crankpin is imparted to the tool carriage and the cutter head.

Heretofore, the roller and template have been forced against each other by a hydraulic actuator which bears on the longitudinal carriage and exerts on the tool carriage such a strong force that the template carried by the tool carriage is urged against the roller with sufficient force so that a disengagement of the roller and template need not be feared during the milling operation. For this reason, the crank which carries the roller must take up and transmit to the longitudinal carriage not only the corresponding components of the cutting forces but also particularly the strong forces by which the roller and template are urged against each other. This involves an application of considerable loads on the crank bearing and the crank drive so that an expensive, heavy structure is required and the accuracy with which the movement of the tool carriage can be controlled by such copying attachment is reduced. Another disadvantage of the known copying attachment resides in that the recessing movement of the cutter head and the depth to which the cutter head plunges with its cutting edges into the crankshaft to the same depend only on the roller and template because the hydraulic actuator advances the tool carriage toward the workpiece to such an extent that the roller and template of the copying attachment engage each other so that a transition from a plunge-cut operation to a circular milling may involve a formation of flattened portions on the milled portion because the cutter is not guided during its cutting movement.

It is an object of the invention to eliminate these disadvantages and to provide a copying attachment which is of the kind described first hereinbefore and in which the load on the crank that is mounted in the longitudinal carriage and carries the roller is minimized and there is no risk of a formation of flattened portions on a milled portion.

This object is accomplished according to the invention essentially in that the hydraulic actuator has one end connected to the tool carriage and a free end remote therefrom and facing the axis of the arcuate template edge portion. This free end carries a pressure-applying head, and the roller is disposed between the pressure-applying head and the template. Because the roller is disposed between the pressure-applying head and the template, there is a closed force-transmitting path from the tool carriage via the hydraulic actuator, its pressure-applying head, the roller and the template and from the latter back to the tool carriage when the roller and template are forced against each other. Because force is transmitted along that closed path, no force is transmitted to the longitudinal carriage and the roller-carrying crank although the template and roller are forced against each other, and the crank is required to take up and transmit to the longitudinal carriage during the milling operation only the corresponding component of the cutting force so that a lighter and simpler structure and more accurate work are possible.

It will be particularly desirable to provide, in accordance with the invention, an additional hydraulic actuator extending in the direction of the transverse guide and directly connecting the tool carriage and the longitudinal carriage. In that case the hydraulic actuator which carries the pressure-applying head must be used only to force the roller and template against each other whereas the other hydraulic actuator is used to impart to the tool carriage only those movements which are independent of the actual copy control operation, i.e., particularly also the plunge-cut movement of the cutter head, so that the crank mounted in the longitudinal carriage is not loaded at all during such movements.

When it is desired to mill a crankpin of a crankshaft, the copying attachment according to the invention operates in such a manner that the hydraulic actuator which acts directly on the longitudinal carriage is operated initially to impart to the tool carriage a plunge-cut movement until the plunge-cut operation has been performed to a depth which is defined by a stop. It will be understood that the other hydraulic actuator and its pressure-applying head and the template connected to the tool carriage have been displaced relative to the roller at the same time. This hydraulic actuator is now operated to extend the pressure-applying head until the roller is firmly gripped between the template and the pressure-applying head. When the cutter head of the milling machine has performed the plunge-cut operation to the desired depth, the crankshaft to be milled is rotated and the crank carrying the roller of the copying attachment is driven in synchronism with said crankshaft. The template is now continuously held in contact with the revolving roller by the pressure-applying head and is positively reciprocated as is required for the circular milling of the crankpin and thus controls the movement of the tool carriage and cutter head relative to the rotating workpiece.

In accordance with a preferred feature of the invention, the template is mounted on a separate template carriage displaceable in unison with the tool carriage and which is coupled to the tool carriage by screws which extend in the direction in which it is displaceable. This arrangement affords the advantage that the template is readily accessible and can easily be replaced and that the differential thermal expansion of the cutter head, on the one hand, and the template or copying attachment, on the other hand, owing to the heat generated by the milling operation, can be compensated.

To ensure that a formation of flattened portions on the milled portion will be avoided, it is a feature of the invention that a stop adjustably positionable by a set screw for limiting the plunge-cut movement of the cutter head is mounted in the longitudinal carriage. By means of such stop, the plunge-cut movement of the cutter head can be arrested slightly before the workpiece has been cut to the desired depth so that a direct transition to circular milling cannot result in a formation of flattened portions, which would be due to the fact that the milling cutter cuts without being guided and which could not be subsequently corrected. To ensure that flattened portions will not be formed, the stop can be adjusted so that the milled portion has a small hump, which can easily be removed during the subsequent finishing.

It will also be particularly desirable if, in accordance with the invention, the roller consists of two-coaxial sections mounted on the same crankpin on the crank, and one of said sections is adapted to cooperate with the template and the other with the pressure-applying head of the hydraulic actuator. Because the pressure-applying head and the template do not act on one and the same part of the roller, any bearing clearance between the sections of the roller and the crankpin which carries these sections cannot influence the accuracy of the control provided by the copying attachment.

In accordance with another feature of the invention, the pressure-applying head is guided along a straight line by rails and comprises a pressure-applying fork pivoted on an axis that is parallel to the axis of the roller and extends through the center of the circle defined by the template edge portion. This arrangement ensures that the pressure-applying head satisfactorily engages the roller regardless of its angular position and forces the roller and template against each other in such a manner that during a rotation of the crank the latter cannot be subjected even to a component of the gripping force and the hydraulic actuator is not subjected to a bending load, either.

Figure 2:
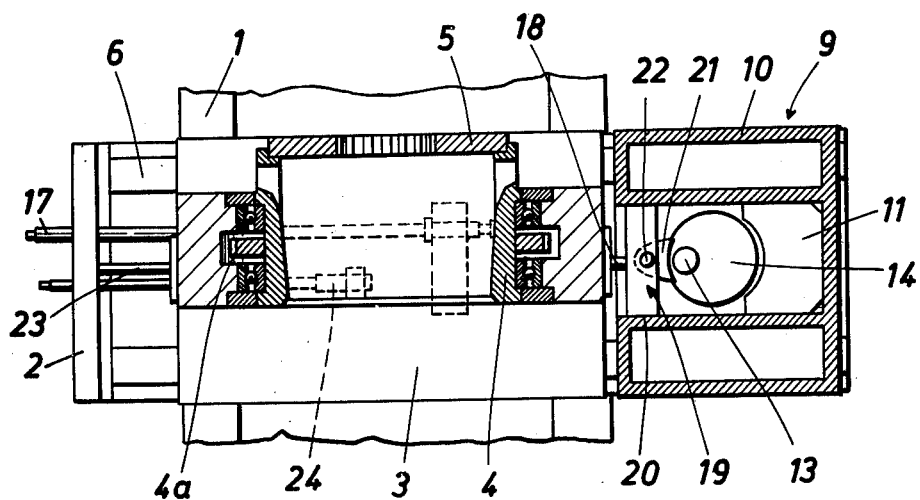

An embodiment of the invention is shown diagrammatically and by way of example on the accompanying drawing, in which FIG. 1 is a transverse sectional view showing a crankshaft-milling machine provided with a copying attachment according to the invention, FIG. 2 is a sectional view taken on line II—II in FIG. 1, and FIG. 3 is a side view, partly in section, showing the clamping arrangement for the crankshaft workpiece.

A longitudinal carriage 2 is mounted in a machine bed 1 of a crankshaft-milling machine and is displaceable parallel to the longitudinal axis of the machine. The longitudinal carriage 2 carries a tool carriage 3 provided with cutter head 4 which comprises an annular tool 5 provided with inwardly directed cutting edges extending along, and defining, a cutting circle 12. The cutter head is a drum mounted for rotation on the tool carriage 3, as shown in FIG. 2, the drum being equipped with gear 4a meshing with pinion 4b driven by belt drive 4c for rotating the cutter head. Cutting tool 5 is mounted on one end of cutter head 4. Such a rotary cutter head is conventional, as shown in U.S. Pat. No. 3,899,814, dated Aug. 19, 1975. The tool carriage 3 is slidable along transverse guides 6 provided on longitudinal carriage 2 in a direction which is normal to crankshaft workpiece 7 held in position for rotation in the manner illustrated in FIG. 3 and described hereinbelow. When it is desired to machine the crankshaft workpiece 7, which is surrounded by the tool 5, the workpiece is rotated. When it is desired to mill crankpin 8, cutter head 4 and cutting tool 5 carried therein must perform an additional transverse movement, which is due to and depends on the eccentricity of the crankpin 8. For the control of this movement of the cutter head, a copying attachment 9 is provided by which the tool carriage 3 can be displaced as desired relative to the crankshaft workpiece 7 which is to be milled.

As shown in FIG. 3 and known, for example, from U.S. Pat. Nos. 2,650,522, dated Sept. 1, 1953, and 3,956,680, dated May 11, 1976, crankshaft workpiece 7 is clamped between two vises 7a, 7b positioned to face respective ends of cutter head 4 and rotated by one of the chucks 7c. As illustrated in FIG. 3 merely by way of example, a gear train generally indicated at 26 interconnects crank 14 and chuck 7c for driving the crankshaft workpiece synchronously with crank 14. Any suitable synchronous drive transmission may be used to connect chuck 7c and crank 14, such synchronization of two rotary movements being well known to any mechanic. Generally, crankshaft milling machines, for which the copying attachment of the invention is used, are known from these U.S. patents and from British Pat. No. 856,419, published Dec. 14, 1960.

The copying attachment 9 essentially comprises template 11, which is held stationary in template carriage 10 and defines an arc of a circle having a radius equal to that of cutting circle 12 defined by the cutting edges of cutter tool 5, and roller 13 which cooperates with that circular template. The roller 13 has a diameter equal to that of crankpin 8 to be milled and is carried by crank 14 which is mounted in longitudinal carriage 2. Roller 13 has an eccentricity with respect to the rotary axis of crank 14 equal to the eccentricity of crankpin 8 which is to be milled. The crank 14 and workpiece 7 are driven in synchronism by worm gear 15 mounted on crank 14 and meshing with interengaging gears 16 driving gear train 26 connected to chuck 7c rotating the workpiece. When it is desired to mill the crankpin 8 roller 13 is forced against and constantly held is contact with the circular-arc template 11, causing rotating crank 14 and the roller 13 to impart to the template and template carriage 10 the reciprocating motion required to mill the crankpin. Because the screws 17 firmly connect the template carriage 10 to the tool carriage 3, that motion is transmitted also to the tool carriage 3, cutter head 4 and tool 5, so that the crankpin can be formed by circular milling. Besides, the screw 17 can be used to compensate the differential expansion between cutter head 4 and copying attachment 9, due to the heat which is generated by the milling operation.

The roller 13 is forced against the template 11 by a hydraulic actuator 18 mounted on tool carriage 3 and projecting toward the axis of the template and at its free end carries a pressure-applying head 19 so that the roller 13 is gripped firmly between head 19 and template 11. The pressure-applying head 19 protrudes from the tool carriage 3 into the template carriage 10 and is guided in the latter in a straight line along rails 20 and comprises a pressure-applying fork 21 pivoted on pin 22, which is parallel to roller 13. To ensure gripping of roller 13 between template 11 and pressure-applying fork 21 without bearing clearance, the roller 13 consists of two sections, one of which, designated 13a, is engageable by the pressure-applying fork 21, whereas the other section 13b, which corresponds to crankpin 8 that is to be milled, is forced against template 11. Because roller 13 is directly gripped between pressure-applying head 19 and template 11, the gripping force does not act on crank 14 because force is transmitted along a closed path which extends from the tool carriage via hydraulic actuator 18, pressure-applying head 19, roller 13, template 11 and template carriage 10 back to the tool carriage 3. In this manner, rotation of crank 14 will cause tool carriage 3 to be displaced transversely along guides 6.

Template 11 is stationary with respect to tool carriage 3 and moves therewith, roller 13 is pressed against the template by hydraulically operated head 19, hydraulic actuator 18 for head 19 also being carried by tool carriage 3. During milling, roller 13 is gripped between template 11 and pressure-applying head 19 so that the cranking of the roller by crank 14 causes a linear reciprocatory movement of tool carriage 3 in a direction transverse to the axis of crankshaft 7 (or crankpin 8) being milled. Since the geometric and kinematic conditions of crank 14 and roller 13 correspond exactly to those of crankshaft 7 and crankpin 8, the reciprocation of the tool carriage produces the desired shape of the crankpin.

A second hydraulic actuator 23 serves to impart to the tool carriage a movement which is independent of the copy control movement. The hydraulic actuator 23 directly connects tool carriage 3 and longitudinal carriage 2 and can move tool carriage 3 along transverse guides 6 without loading crank 14 of the copying attachment and the bearings and drive means for such crank. For this reason, hydraulic actuator 23 is used also to impart to the tool 5 a plunge-cut movement, which is limited by a stop 24 mounted in the longitudinal carriage 2 and adjustably positionable therein by a set screw. Because this stop 24 is adjustable, the plunge-cut path can be limited so that there is no risk of a formation of a flattened portion, which would be due to a cutting operation performed by the tool while it is not guided and which could not be subsequently corrected.

When it is desired to mill crankpin 8, hydraulic actuator 23 is initially operated to move tool carriage 3 from its starting position shown in FIGS. 1 and 2 as far as to stop 24 to cause the tool 5 to cut into crankshaft workpiece 7 which is to be machined. When tool carriage 3 has reached stop 24, the means for driving crankshaft 7 and crank 14 synchronously are started. In the meantime, hydraulic actuator 18 has also been operated to grip roller 13 firmly between template 11 and pressure-applying head 19. As a result of the rotation of crank 14, the cutter head is constrained to perform exactly the transverse movement required for a circular milling. In that operation, only the corresponding component of the cutting force rather than the gripping force, too, is transmitted to crank 14.

Stop 24 is not essential for the operation of the copying attachment since the plunge-cut movement is terminated automatically when template 11 and roller 13 are in contact but the stop permits termination of the plunge-cut before this end position has been reached. Therefore, there is no danger that the circular milling subsequent to the plunge-cut will produce a flattened portion on the milled workpiece. While termination of the plunge-cut just before the full geometric depth of the cut has been reached will leave a slight projecting burr on the crankpin, this may be readily removed by subsequent machining to obtain an exact circular shape. With the use of stop 24, a certain clearance remains between template 11 and roller 13 at the beginning of the milling operation and this is eliminated by crank 14 only shortly before the start of the rotary motion of the workpiece, at the point when stop 24 becomes ineffective and roller 13 is pressed against template 11 by head 19. During milling, crankshaft 7 and crank 14 are rotated in synchronism. However, when tool 5 first cuts into the crankshaft, the crankshaft and the crank are stationary, the rotation of the crankshaft and crank being initiated after the plunge-cut movement.

I claim:

1. A copying attachment for a crankshaft milling machine which comprises a machine bed having a longitudinal axis, a longitudinal carriage mounted on the machine bed for movement along the longitudinal axis of the machine bed, the longitudinal carriage having transverse guide means extending transversely to the longitudinal axis, a tool carriage mounted on the longitudinal carriage for movement in unison therewith along the longitudinal axis of the machine bed and for reciprocation relative to the longitudinal carriage along the transverse guide means, a cutter head mounted on the tool carriage for movement in unison with the tool carriage along the transverse guide means and for rotation about an axis, the cutter head having a cutting tool with inwardly directed cutting edges extending along and defining a cutting circle upon rotation of the cutter head, the cutting edges being capable of machining a workpiece rotating about the axis of rotation of the cutter head and surrounded by the cutting edges of the cutting tool, the copying attachment comprising (a) a template connected to the tool carriage for reciprocation in unison therewith along the transverse guide means and having an edge portion along an arc of a circle having the same radius as the cutting circle and being centered about an axis, (b) a roller mounted on the longitudinal carriage for movement in unison therewith along the longitudinal axis and for rotation about an axis parallel to the axis about which the arc of a circle of the template edge portion is centered, (c) revolving means for revolving the roller about a third axis parallel to, and spaced from, the axes of the arc of a circle of the template edge portion and of the roller, and (d) a hydraulic actuator having one end connected to the tool carriage for movement in unison therewith along the longitudinal axis and extending in the direction of the transverse guide means, the actuator including a pressure-applying head connected to another end of the actuator remote from the one end, the pressure-applying head being arranged adjacent a side of the roller remote from the edge portion of the template and the actuator being operable to press the pressure-applying head into engagement with the remote side of the roller to force the roller towards the edge portion.

2. The copying attachment of claim 1, the axis of rotation of the cutter head being parallel the longitudinal axis of the machine bed, and the axis about which the arc of a circle of the template edge portion being centered is transverse to the transverse guide means.

3. The copying attachment of claim 1, the revolving means comprising a crank mounted in the longitudinal carriage for rotation about the third axis.

4. The copying attachment of claim 1, the pressure-applying head being offset from the edge portion of the template in the direction of the axis of rotation of the roller, and the roller comprising two coaxial sections, one of the roller sections being aligned with the pressure-applying head and the other roller section being aligned with the template edge portion.

5. The copying attachment of claim 1, a second hydraulic actuator connecting the tool carriage to the longitudinal carriage and extending in the direction of the transverse guide means.

6. The copying attachment of claim 1, a carriage for the template and screw means connecting the template carriage to the tool carriage whereby the template carriage is movable with the tool carriage in the direction of the transverse guide means, the screw means extending in said direction.

7. The copying attachment of claim 1, rail means affixed to the tool carriage and extending in the direction of the transverse guide means, the pressure-applying head comprising two parts, a first pressure-applying head part engaging the rail means and being guided thereby in a straight line into the engagement with the remote roller side to force the roller towards the template edge portion, and the second pressure-applying head part being pivoted to the first part about the axis about which the arc of the circle of the template edge portion is centered.

8. The copying attachment of claim 7, the hydraulic actuator comprising a piston rod affixed to the first pressure-applying head part and extending towards the template.

9. The copying attachment of claim 7, a carriage for the template and screw means connecting the template carriage to the tool carriage whereby the template carriage is movable with the tool carriage in the direction of the transverse guide means, the screw means extending in said direction and the rail means being secured to the template carriage.

10. The copying attachment of claim 1, an adjustably positionable stop in the path of the reciprocation of the tool carriage relative to the longitudinal carriage for limiting the reciprocation in a direction towards the longitudinal axis of the machine bed.

11. The copying attachment of claim 1, drive means for rotating the workpiece supporting means about the axis of rotation of the cutter head, drive means for rotating the revolving means about the third axis, and means for synchronizing the drive means for rotating the workpiece and the revolving means in synchronism.

* * * * *